May 3, 1960 W. H. BROWN 2,934,891
ANTI-SCREECH INNER BODY
Filed Aug. 31, 1956

INVENTOR
WILLIAM H. BROWN
BY Vernon F. Hauschild
ATTORNEY

United States Patent Office 2,934,891
Patented May 3, 1960

2,934,891

ANTI-SCREECH INNER BODY

William H. Brown, Manchester, Conn., assignor to United Aircraft Corporation, East Hartford, Conn., a corporation of Delaware Application August 31, 1956, Serial No. 607,483

3 Claims. (Cl. 60—35.6)

This invention relates to vibration suppression and more particularly to the suppression of high frequency vibration experienced in combustion chamber and afterburner operation known as "screech."

It is an object of this invention to provide a simple method for suppressing high frequency vibrations encountered in combustion which is light in weight and which does not detrimentally affect combustion.

It is a further object of this invention to provide means for suppressing high frequency, combustion excited, vibrations in a combustion chamber or afterburner which means is centrally located within the combustion chamber, extends substantially the full combustion chamber length and occupies a relatively small volume with respect to the volume encompassed by the combustion chamber.

It is still a further object of this invention to provide a means for suppressing high frequency vibrations encountered in combustion, which means is not located in the combustion zone per se and is so positioned that the combustion gases do not pass through the suppression means in their normal flow.

These and other advantages of my invention will be more clearly understood when the following drawings are viewed in connection with the appended description.

Figure 1:
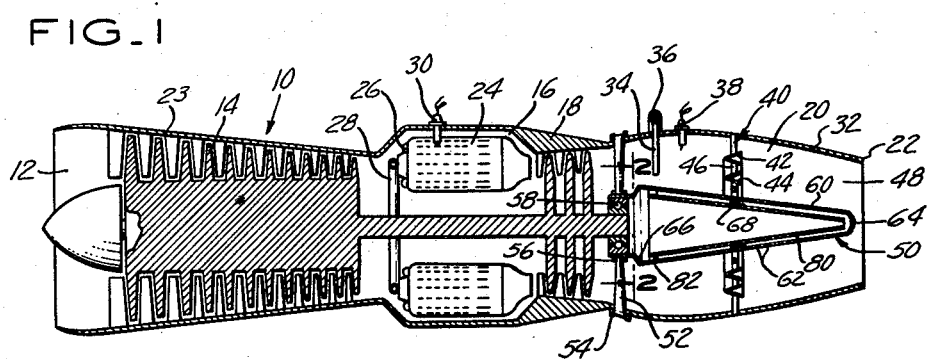
Fig. 1 is a cross-sectional view of an aircraft jet engine with an afterburner incorporating my screech suppression device.

Referring to Fig. 1, we see aircraft jet engine 10 which consists of air inlet section 12, compressor section 14, combustion section 16, turbine section 18 and afterburner 20 which has circular relatively large exhaust outlet 22 at its after or downstream end. Engine housing 23 extends from the front of air inlet section 12 to a point just downstream of turbine section 18 and encloses compressor section 14, combustion section 16 and turbine section 18 to form an annular gas passage therewith. Afterburner 20 is attached to engine housing 23.

In operation, air enters engine 10 through air inlet section 12 and is compressed as it passes through compressor section 14. The air is then heated as it passes through combustion section 16 due to the combustion which takes place in combustion chambers 24. Fuel is introduced into combustion chambers 24 in atomized form by fuel nozzles 26, which are provided fuel through fuel manifold 28. Fuel is provided to fuel manifold 28 from any pressure source such as a fuel pump (not shown). Spark plug 30 or any other ignition means may be used to ignite the fuel in combustion chambers 24. The heated and compressed air then passes through turbine section 18 and thence into afterburner 20. The gases are reheated in afterburner 20 and discharged through exhaust outlet 22.

Afterburner 20 consists of afterburner duct 32 which, while not necessarily so limited, may be circular in cross section, and forms a relatively large gas passage and which is provided fuel by one or more fuel spray bars 34 which extend radially into afterburner duct 32 and which are in turn furnished fuel by manifold 36. Pressurized fuel is provided to manifold 36 by any conventional means such as a fuel pump (not shown). The fuel which enters afterburner 20 through spray bars 34 enters in an annular pattern due to the circumferential positioning of spray bars 34 and is ignited by any conventional ignition means such as spark plug 38. Flameholder 40 which consists of two rings 42 and 44 of trough shaped cross section held by support bars 46. The function of flameholder 40 is to provide an area of relatively stagnant air downstream thereof so that combustion may be supported in the combustion region 48. Combustion zone or region 48 is annular in shape and extends from a point just downstream of flameholder 40 to approximately exhaust outlet 22.

It is a characteristic of combustion of the type which takes place in a combustion chamber such as an afterburner that high frequency vibrations are excited by the combustion processes which are of such intensity that physical damage may be done to engine parts and further which are frequently of such frequency that the noise created thereby is annoying to personnel. Further, whether the high frequency combustion excited vibrations, just described, and known as "screech," lies in an audible or inaudible frequency spectrum, the vibrations may be damaging to the human body as well as to the engine parts.

Figure 2:
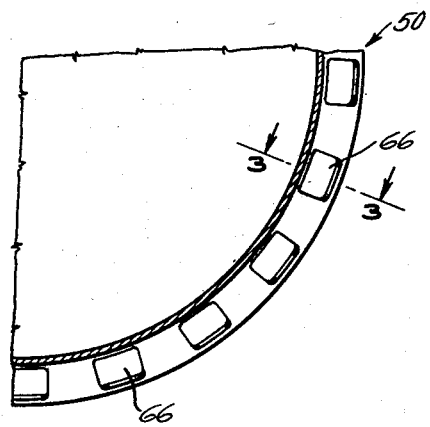
Fig. 2 is a view taken along line 2—2 of Fig. 1.
Figure 3:
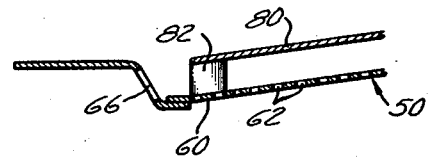
Fig. 3 is a view taken along line 3—3 of Fig. 2.
Figure 4:
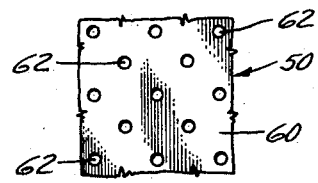
Fig. 4 is an enlarged fragmentary view showing the perforations.

To abate or disperse the high frequency vibration known as "screech," I propose to provide an elongated inner body 50 which will be concentric with and contained within afterburner duct 32 and extends substantially the full length of afterburner 20 or the full length of the combustion zone 48 so that an annular exhaust gas passage which is linearly axially extending is formed between the inner body and the afterburner duct. The volume encompassed by inner body or perforated shell 50 will be relatively small with respect to the volume encompassed within afterburner duct 32 and inner body 50 will be so positioned that it will be radially inboard of combustion zone 48 which lies in the annular passage formed between afterburner duct 32 and inner body 50. Inner body 50 may be supported within afterburner duct 32 by any convenient means such as centering pins 52 which are supported by bosses 54 in afterburner duct 32 and which engage bosses 56 in inner body 50. A plurality of these centering pins 52 are spaced circumferentially about afterburner duct 32 or engine housing 23 and are directed radially inward so as to engage bosses 56 in inner body 50. These same centering pins may be used to engage and position a bearing or bearing support 58. The axial walls 60 of inner body 50 may be made of sheet metal and will contain a plurality of closely spaced perforations 62 throughout the length of inner body 50 which is immediately radially inboard of combustion zone 48. Inner body 50 is shown as roughly a thin walled hollow conical frustum with perforation 62 lying in its axial walls 60 and ending in a solid wall 64 at its downstream end. Inner body 50 may, however, be cylindrical or any other convenient shape. Inner body 50 is sufficiently small and because of its central and concentric position with respect to afterburner duct 32 it does not interfere with the combustion which takes place in combustion zone 48, which combustion zone is of annular shape whether or not inner body 50 is placed in afterburner 20. Further, due to the velocity of the gases passing through afterburner 20, the heated gases will be directed downstream and will not, to other than possibly a nominal degree, pass through perforation 62. Windows 66, as best shown in Fig. 2, are located at the forward end of inner body 50 and perform the function of providing cooling air to the walls of the inner body. Either ram air or compressor air may be ducted through windows 66 to perform this cooling function. Further, because inner body 50, while not in the combustion zone per se, is nevertheless located in a high temperature region, it might be advisable to provide stiffening means such as ribs 68 for inner body support purposes. Inner body 50 tapers rearwardly and is preferably of substantially circular cross-section as is afterburner duct 32.

Perforations 62 may be of uniform size and spacing throughout inner body 50 or the size and/or spacing may vary throughout the length of the inner body 50. The size, number and spacing of perforations 62 are chosen such that inner body 50 is tuned to the frequency of the screech pressure oscillations or fluctuations, thereby producing the greatest screech abatement. Liner 80 may be placed inboard of inner body 50 to provide an acoustic cushion to further assist in abating screech by suppressing or dispersing the screech high pressure fluctuations.

A plurality of spacers 82, which may be V-shaped in cross-section, may be used to support liner 80 within inner body 50.

As combustion takes place in annular combustion zone 48 of afterburner 20, high frequency vibrations or fluctuations are created thereby and as these vibrations or pressure fluctuations move radially inward they are intercepted by inner body 50 and are broken up in a noise abatement or suppression function as they are passed through perforations 62. By passing through perforations 62, the objectionable high frequency vibrations or pressure fluctuations are broken up or destroyed thereby abating "screech."

It is to be understood that the invention is not limited to the specific embodiment herein illustrated and described, but may be used in other ways without departure from its spirit as defined by the following claims.

I claim:

1. An afterburner having an axis and comprising an afterburner duct of substantially circular cross section and having an exhaust outlet of relatively large area at its downstream end, means to introduce fuel in an annular pattern into said afterburner duct, means to ignite said fuel so introduced, annular blockage means to form a relatively stagnant annular zone within said afterburner duct to form an annular combustion zone downstream of said blockage means, a thin-walled, hollow, elongated inner body of substantially circular cross-section located within said afterburner duct and extending substantially the full length thereof, means to position said inner body concentrically within said afterburner duct to cooperate therewith to define an annular gas passage therebetween, said afterburner duct and said inner body being so shaped that said annular gas passage is substantially linearly axially extending, means to block off the after end of said inner body, said inner body encompassing a relatively small volume with respect to the volume encompassed by said afterburner duct and positioned immediately radially inward of the combustion zone of said afterburner, said inner body having closely spaced small perforations in its walls extending for the full length of said combustion zone and positioned to intercept radial, combustion excited pressure fluctuations.

2. An aircraft jet engine having an axis and comprising an engine housing enclosing a compressor and a turbine with a combustion section located between said compressor and said turbine and located within said engine housing to define an annular gas passage therethrough, in combination with an afterburner located downstream of said turbine which afterburner comprises an afterburner duct of substantially circular cross section attached to said engine housing and forming a relatively large gas passage therewith and having an exhaust outlet of relatively large area at its downstream end so that exhaust gases from said engine annular gas passage pass through said afterburner duct at selected velocity and pressure to be discharged through said exhaust outlet to atmosphere, an elongated inner body of substantially circular cross section located centrally within said afterburner duct and extending substantially the full length thereof so that an annular, linearly axially extending exhaust gas passage is formed between said afterburner duct and said inner body and forming a continuation of said engine annular gas passage, means to introduce fuel into said afterburner annular gas passage so that a fuel-air mixture is formed by said fuel and said exhaust gases, means to ignite said fuel-air mixture and establish an annular, linearly axially extending combustion zone in said afterburner annular gas passage of a particular pressure fluctuation frequency, said inner body being shaped substantially as a thin-walled hollow cone frustum tapering rearwardly and with the after end blocked off by a solid thin wall, said inner body encompassing a relatively small volume with respect to the volume encompassed by said afterburner duct and having closely spaced small perforations in its tapering walls extending for the full length of said combustion zone and positioned immediately radially inward thereof to intercept radial, combustion excited pressure fluctuations and being of such size, number and spacing so that said inner body is tuned to said pressure fluctuation frequency, and means to cool said inner body.

3. An afterburner comprising an afterburner duct of substantially circular cross section and having an exhaust outlet of relatively large area at its downstream end, an elongated inner body of substantially circular cross section located centrally within said afterburner duct and extending substantially the full length thereof to form an annular, linearly axially extending gas passage therebetween, said inner body being shaped substantially as a thin-walled hollow body with axially extending walls and with the after end blocked off by a solid thin wall, means to introduce fuel into said gas passage, means to ignite said fuel so introduced, annular blockage means located in said gas passage to form an annular combustion zone therein downstream of said blockage means, said inner body encompassing a relatively small volume with respect to the volume encompassedf by said afterburner duct and positioned immediately radially inward of said combustion zone, said inner body having closely spaced perforations in said axially extending walls extending for the full length of said combustion zone and positioned immediately radially inward thereof to intercept radial, combustion excited pressure fluctuations, and a liner supported in spaced relation inboard of said axially extending walls of said inner body to form an acoustic cushion therewith.

References Cited in the file of this patent

UNITED STATES PATENTS

| 2,379,017 | McCollum | June 26, 1945 |
|---|---|---|
| 2,380,602 | McCollum | July 31, 1945 |
| 2,402,970 | McCollum | July 2, 1946 |
| 2,674,845 | Pouchot | Apr. 13, 1954 |
| 2,775,864 | Karcher | Jan. 1, 1957 |
| 2,828,605 | Dodson | Apr. 1, 1958 |